United States Patent [19]

Ikari et al.

[11] 4,216,084
[45] Aug. 5, 1980

[54] METHOD FOR TREATING WASTE WATER CONTAINING ORGANIC CONTAMINANTS UTILIZING A MAGNESIA ADSORBENT

[75] Inventors: Yoshikatsu Ikari, Narashino; Shoichiro Yokoyama, Musashi-Murayama; Ryutaro Itaya; Tsuneo Ohkuma, both of Norboribetsu, all of Japan

[73] Assignees: Agency of Industrial Science & Technology, Tokyo; Hokkaido Soda Co., Ltd., Hokkaido, both of Japan

[21] Appl. No.: 851,178

[22] Filed: Nov. 14, 1977

Related U.S. Application Data

[62] Division of Ser. No. 802,117, May 31, 1977, Pat. No. 4,147,665.

[30] Foreign Application Priority Data

Jun. 7, 1976 [JP] Japan .................................. 51-66214
Sep. 1, 1976 [JP] Japan ................................. 51-104578

[51] Int. Cl.$^2$ .............................................. C02B 1/14
[52] U.S. Cl. .......................................... 210/32; 210/40
[58] Field of Search ....................... 210/10, 32, 40, 45, 210/47, 502, 51, 28

[56] References Cited

U.S. PATENT DOCUMENTS

| | | | |
|---|---|---|---|
| 2,292,632 | 8/1942 | Greger | 210/502 X |
| 2,491,033 | 12/1949 | Byrns et al. | 423/636 |
| 4,019,982 | 4/1977 | Ikari et al. | 210/40 X |
| 4,118,319 | 10/1978 | Miyanohara et al. | 210/51 |
| 4,125,466 | 11/1978 | Miyanohara et al. | 210/10 X |
| 4,163,715 | 8/1979 | Ikari et al. | 210/40 X |

Primary Examiner—Thomas G. Wyse
Attorney, Agent, or Firm—Armstrong, Nikaido, Marmelstein & Kubovcik

[57] ABSTRACT

Magnesia particles obtained by calcining at a temperature of 500°–700° C. show excellent adsorbing properties.

8 Claims, 2 Drawing Figures

METHOD FOR TREATING WASTE WATER CONTAINING ORGANIC CONTAMINANTS UTILIZING A MAGNESIA ADSORBENT

This is a division, of application Ser. No. 802,117, filed May 31, 1977, U.S. Pat. No. 4,147,665.

BACKGROUND OF THE INVENTION

The present invention relates to a novel method for treating waste water containing organic contaminants utilizing the magnesia adsorbent.

Hereinbefore, there have been known methods for obtaining magnesia by calcining magnesium compounds, such as magnesium hydroxide, basic magnesium carbonate and the like, which produce magnesia by thermal decomposition. However, all of known magnesias have been obtained by calcining at high temperatures of 800°–900° C. or more.

Meanwhile, waste water drained from various chemical plants, such as pulp mill waste water, bleaching waste water, waste water from food manufacturing plants, humic substances containing water and dye works waste water, contain organic substances which cause environmental pollution. For instance, pulp mill waste water contains a great quantity of lignin and its derivatives and divatured hemicellulose, and, accordingly, the chromaticity becomes remarkedly bad and the COD value and the BOD value become remarkedly high. Therefore, when discharging to rivers, removal of such contaminants is required. Hereinbefore, various methods for treating such waste water have been proposed. Among them massive lime method and coagulation method using inorganic flocculants such as aluminium salt, iron salt and magnesium salt have been known as effective methods. Especially, massive lime method has been known as one of the most effective methods for treating pulp mill waste water. However, such known methods are not yet sufficient and have disadvantages in removing efficiency of contaminants, sedimentation efficiency of produced flock, dehydrating efficiency of produced slurry and treatment of produced sludge.

An object of the present invention is to solve such conventional defects, and to provide a novel method utilizing an adsorbent showing excellent adsorption properties to such waste water containing organic contaminants and also capable of effectively utilizing for other various adsorption purposes.

An another object of the present invention is to provide a novel method utilizing a magnesia adsorbent which is easily regenerated and showing excellent adsorption properties as compared with conventional magnesia adsorbents.

An other object of the present invention is to provide a novel method utilizing a magnesia adsorbent containing an additive which shows an extending effect without lowering the adsorption properties.

An other object of the present invention is to provide a method for treating waste water containing organic contaminants using above magnesia adsorbent.

Other objects and advantages of the present invention will appear from the following description.

SUMMARY OF THE INVENTION

The aforesaid objects are achieved by using magnesia particles obtained by calcining magnesium compound, which is capable of producing magnesia by thermal decomposition, at a temperature of 500°–700° C.

The magnesia adsorbent thus obtained has remarkably higher adsorption properties as compared with conventional magnesia adsorbents and, after adsorption treatment, the adsorption properties are easily recovered by calcining at the temperature mentioned above. Moreover, some kinds of metal oxides show extending effects without lowering the adsorption properties of the magnesia adsorbent and, instead, some of them can improve the adsorption properties.

PREFERRED EMBODIMENT OF THE INVENTION

In order to obtain the magnesia adsorbent of the present invention, magnesium compounds, which have been known to be able to produce magnesia by thermal decomposition, such as magnesium hydroxide, magnesium carbonate, basic magnesium carbonate (magnesium hydroxycarbonate) and the like, may be optionally used as starting materials. Such magnesium compounds are calcined by conventional means.

According to the present invention, the calcination temperature is selected from the range of 500°–700° C., more preferably 500°–650° C. When the calcination temperature is higher than 700° C., the adsorption properties of the obtained magnesia are remarkably lowered and, after adsorption treatment, the adsorption properties are not recovered if recalcined. When the calcination temperature is lower than 500° C., the adsorption properties of the obtained magnesia are too inferior to utilize in practice. The calcination time at 500°–700° C. is preferably 40–60 minutes.

The magnesia adsorbent of the present invention has preferably the particle size of less than 30 mesh.

The magnesia adsorbent of the present invention has low crystallrity as compared with conventional light calcined magnesia, and the apparent specific gravity is about 0.47–0.37. The magnesia of the present invention shows excellent sedimentation effect when using in an aqueous solution.

The magnesia adsorbent of the present invention may be used together with other adsorber or filler. Especially, when mixing with at least one metal oxide selected from kaoline, ferric oxide ($Fe_2O_3$), Calcium oxide (CaO) and alumina ($Al_2O_3$), volume of the adsorbent is increased and moreover the adsorption properties are improved. In such a case, the metal oxide is preferably mixed 5–40% by weight, more preferably 10–30% by weight, based on the total weight of magnesia and metal oxide to be mixed. Among them, alumina is the most preferable additive. Such a mixed adsorbent has more improved adsorption properties and the following advantages. That is, the adsorption force is not lowered after regeneration treatment and it shows excellent sedimentation effect. Such a mixed adsorbent may be prepared either by mixing the beforementioned magnesia and metal oxide obtained by calcining the corresponding metal hydroxide or kaoline at 500°–700° C., or by calcining the mixture of the beforementioned magnesia-formable material and metal hydroxide or kaoline at 500°–700° C.

The magnesia adsorbent of the present invention has excellent adsorption properties and is easily regenerated and is widely utilized as adsorbent in various field.

Especially, when utilizing it for treating waste water containing organic contaminants, the organic contaminants are very effectively removed. In this case, the pH value of waste water treated with the magnesia adsorbent is usually raised to 10–11. When the pH value of waste water treated with the magnesia adsorbent is adjusted to 6.5–8.5, for instance, either by adding a small amount of inorganic acid or by aeration by which dissolved magnesium is carbonated, waste water is highly decolored.

The addition amount of the adsorbent of the present invention into waste water is preferably 5.0–20 times by weight, more preferably 7.5–10 times by weight, based on the COD value of waste water.

The treatment of waste water with the adsorbent of the present invention may be carried out in accordance with various conventional methods such as powder adding method and fluidized bed method. Both of batch operation and continuous operation may be used therefor.

For instance, in case of utilizing powder adding method, the adsorbent powder is directly added to waste water and the mixture is stirred to adsorb contaminants and then the adsorbent adsorbed contaminants is separated by means of conventional method such as sedimentation separation or floatation separation. In this case, if necessary, inorganic or organic flocculant may be added. The slurry thus obtained is dehydrated and recovered as solid matter.

The solid matter thus recovered may be utilized for reclaiming or other purposes, or regenerated by heating at 500°–700° C. to burn the adsorbed organic contaminants and reused as an adsorbent. In case of utilizing column method, the adsorbent powder is molded or granulated in suitable grain size and packed in a column and then waste water is passed through the column.

After equilibrium adsorption is reached, the adsorbent is taken out and treated in the manner mentioned above. In case of utilizing fluidized bed method, the adsorbent powder is packed in a column and waste water is flowed into the column to float the adsorbent and to make fluidized bed. In this case, a portion of the fluidized adsorbent may be continuously taken out, regenerated and repacked to recycle. In case of utilizing conventional precoating method, waste water is passed through layers coated with the adsorbent of the present invention.

According to the method of the present invention, waste water is treated with higher efficiency as compared with conventional massive lime method since the adsorbent to be used has excellent adsorption properties and also the produced sludge has excellent properties of sedimentation and dehydration. Especially, the method of the present invention is effective for treating pulp mill waste water which has been known to be very difficult to convert to non-contaminated water.

In other words, the adsorbent of the present invention shows not only coulombic adsorption but also chelate-forming adsorption mechanism, therefore, the method of the present invention is effective for treating any kinds of pulp mill waste water, and bleachery effluent, for instance, KP waste water, SP waste water, NSCP waste water or CGP waste water.

Lignin derivatives in pulp mill waste water are different in accordance with digesting methods or the sorts of pulp mill waste water. Massive lime method has been known to be one of the most effective methods for such a pulp mill waste water. However, the treatment efficiency of massive lime method greatly changes in accordance with the sorts of pulp mill waste water, and it is effective only for treating KP waste water and not so effective for treating SP waste water, NSCP waste water and KP bleachery caustic extraction stage effluent. For instance, in case of treating NSCP waste water by massive lime method, the decoloring rate or the chromaticity removal rate is at most 40% and the removal rate of lignin like substances is at most 50%. In contrary, the method of the present invention shows excellent effects in any kinds of pulp mill waste water such as NSCP waste water, SP waste water, KP waste water and its bleachery waste water as compared with massive lime method.

Hereinafter, the present invention is explained by Examples in detail.

EXAMPLE 1

Each 50 g of magnesium hydroxide powder (manufactured by Kanto Kagaku Co.) were calcined at constant temperatures of 200, 400, 500, 550, 600, 650, 700, 750, 800 and 1,000° C. for 60 minutes, separately, by using a muffle furnace, and various magnesias having different calcination temperatures were obtained. Waste water from hot chemiground pulp having 1,100 ppm of COD, 1,000 ppm of chromaticity and 5.7 of pH was treated with the adsorbent above obtained. The test results of the adsorption properties are shown in FIG. 1.

The adsorption properties were tested as follows.

Into 200 ml. of waste water 2 g of the adsorbent were added, the mixture was stirred for 1.5–2 hours at 100 rpm and filtered by means of filter paper, and then the COD value and the chromaticity removal rate of the filtrate thus obtained were measured. In this case, the chromaticity was measured in accordance with a working curve previously made from absorbance at 372 m$\mu$ and the COD value was measured in accordance with acidic potassium permanganate method (JISK0102).

Figure 1:
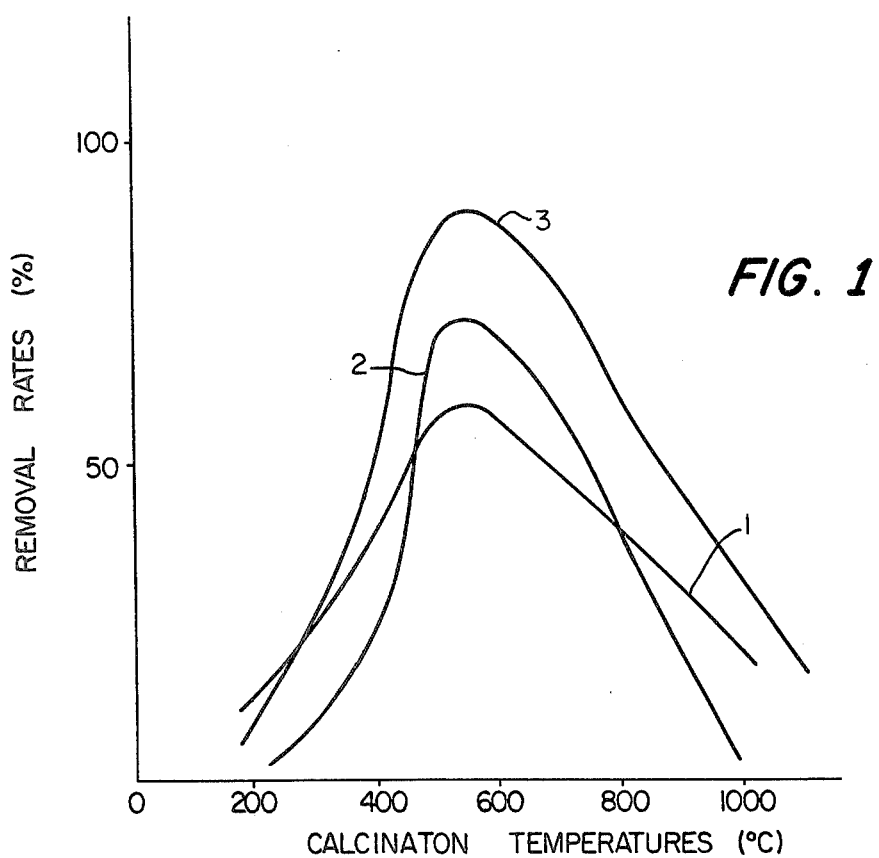
FIGS. 1 and 2 are graphs showing relationships of COD and chromaticity removal rate to calcined temperature.

In FIG. 1, the axis of abscissa shows calcination temperature (°C.) and the axis of ordinate shows removal rates (%) of COD and chromaticity. Curve 1 shows COD removal rate, and curves 2 and 3 show chromaticity removal rates. Curve 2 is the case in which pH was not adjusted and curve 3 is the case in which pH of treated waste water was adjusted to about 7.

Then, in order to know the relationship between structure and calcination temperature in the adsorbent of the present invention, magnesium hydroxide and basic magnesium carbonate were heated at 5° C./min. of temperature elevating speed and change in crystal structure during this heating was observed by X-ray diffraction method and differential thermal analysis. At 470°–500° C., crystal form of magnesium hydroxide and basic magnesium carbonate disappeared with great endothermic reaction and change in weight and crystal of MgO gradually appeared, but at 500°–530° C., weak endothermic reaction took place. The crystal at this point had low crystallinity and porous structure of large inner surface area. As the temperature was elevated, the crystallinity was increased and the activity was lowered. Considering the result in view of the adsorption test results shown in FIG. 1, it appears that the magnesia having low crystallinity immediately after starting magnesium compound is converted to magnesia by calcining at 500°–700° C. shows conspicuously excellent adsorption properties. Such a magnesia is of fine crystal particles, great inner surface area and porous.

EXAMPLE 2

Aluminium hydroxide was mixed with magnesium hydroxide in various ratios and the mixture thus obtained was calcined at 600° C. for 50 min. and the adsorbent composed of alumina and magnesia was obtained.

The adsorption tests were carried out in the same manner set forth in Example 1. The results are shown in Table 1.

Table 1

| Experiment No. | Starting material (weight ratio) ALH/MGH | adsorbent (molar ratio) alumina/ magnesia | COD removal ratio (%) | Chromaticity removal rate (%) | |
|---|---|---|---|---|---|
| | | | | before adjusting pH | after adjusting pH |
| 1 | 0/100 | 0 | 56.9 | 69.8 | 85.4 |
| 2 | 20/80 | 0.093 | 66.6 | 70.5 | 85.5 |
| 3 | 40/60 | 0.250 | 54.2 | 71.5 | 85.0 |
| 4 | 60/40 | 0.560 | 50.2 | 56.8 | 71.5 |
| 5 | 70/30 | 0.873 | 40.3 | 47.3 | 50.4 |
| 6 | 80/20 | 1.500 | 10.8 | 0 | 13.5 |

ALH : Aluminium hydroxide
MGH : Magnesium hydroxide

EXAMPLE 3

A mixture of 80 parts by weight of magnesium hydroxide and 20 parts by weight of aluminium hydroxide was calcined for 2 hours.

Figure 2:
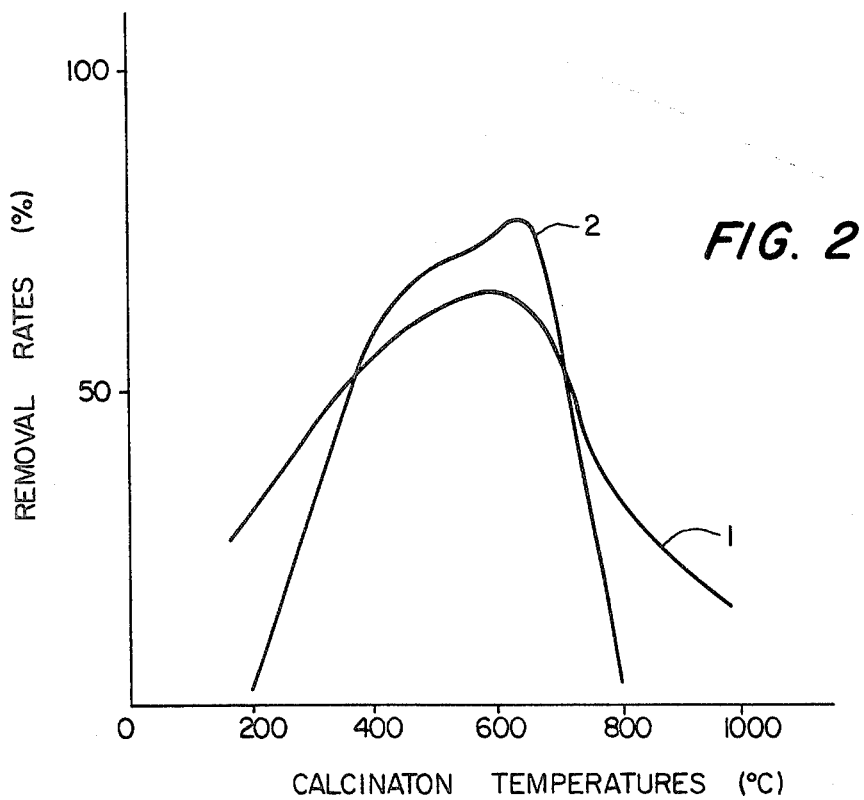

The adsorption test results of the adsorbent thus obtained are shown in FIG. 2. In FIG. 2, the axis of abscissa shows calcination temperature (°C.) and the axis of ordinate shows removal rates (%) of COD and chromaticity, and curve 2 shows chromaticity removal rate in which the pH of treated waste water was adjusted to about 7.

This mixed adsorbent showed very good sedimentation property in comparison with magnesia adsorbent and was easily recovered from waste water.

EXAMPLE 4

With respect to various adsorbent obtained by calcination at 600° C., the adsorption tests were carried out in the same manner set forth in Example 1, and then the adsorbents thus used were calcined at 600° C. and with respect to the recovered adsorbents, the adsorption tests were carried out. These recoveries and adsorption tests were repeated. The results are shown in Table 2.

oxide were mixed and the adsorption tests were carried out on the mixtures thus obtained in the same manner set forth in Example 1.

Table 3

| Additive (weight %) | COD removal rate | CHROMATICITY REMOVAL RATE | | | |
|---|---|---|---|---|---|
| | | 372 mµ | | 420 mµ | |
| | | not adjusted | pH adjusted | not adjusted | pH adjusted |
| Kaolin: 10 | 55 % | 71.0 % | 87.8 % | 84.6 % | 94.3 % |
| Kaolin: 20 | 57.7 | 72.0 | 88.3 | 85.4 | 94.8 |
| " 30 | 54.8 | 71.4 | 88.3 | 83.3 | 94.6 |
| " 40 | 54.0 | 69.0 | 86.9 | 81.2 | 94.1 |
| " 50 | 48.4 | 64.0 | 84.0 | 77.1 | 92.4 |
| Fe$_2$O$_3$: 10 | 56.3 | 66.6 | 83.3 | 87.4 | 91.7 |
| " 20 | 54.6 | 54.7 | 75.5 | 76.5 | 87.0 |
| " 30 | 54.6 | 59.3 | 78.0 | 80.0 | 88.0 |
| " 40 | 53.7 | 59.3 | 78.0 | 80.0 | 88.5 |
| " 50 | 51.1 | 58.2 | 77.0 | 77.5 | 87.5 |
| CaO: 10 | 56.9 | 66.7 | 85.9 | 81.9 | 94.2 |
| " 20 | 61.6 | 63.3 | 86.0 | 73.6 | 94.6 |
| " 30 | 56.5 | 50.0 | 81.7 | 67.5 | 92.7 |
| " 40 | 56.2 | 45.0 | 78.3 | 63.9 | 91.0 |
| " 50 | 56.2 | 42.5 | 78.3 | 61.7 | 91.0 |
| None | 54.6 | 65.0 | 82.5 | 82.5 | 90.6 |

EXAMPLE 6

Magnesium hydroxide and mixtures of 80 parts by weight of magnesium hydroxide and 20 parts by weight of aluminium hydroxide were calcined, separately, under the conditions set forth in Table 4, and various adsorbents differing in calcination conditions were obtained.

With respect to the adsorbent thus obtained, the adsorption tests were carried out by using, as test water, alkali-extracted waste water obtained in the bleaching process of conifer kraft pulp, in the same manner set forth in Example 1.

Properties of test water:
pH: 9.7
COD: 1,000 ppm
Extinction coefficient:

| Wave length | Extinction coefficient | Extinction coefficient at pH 7 |
|---|---|---|
| 372 | 6.15 | 5.85 |
| 420 | 3.25 | 3.00 |

Chromaticity removal rate was estimated by measuring the extinction coefficients at 372 nm and 420 nm after adjusting the pH of the filtrate to 7.

Table 2

| Experiment No. | Adsorbent | COD removal rate % | | | | | chromaticity removal rate % | | | | |
|---|---|---|---|---|---|---|---|---|---|---|---|
| | | no recovery | recovery time | | | | no recovery | recovery time | | | |
| | | | 1 | 2 | 3 | 4 | | 1 | 2 | 3 | 4 |
| 1 | Magnesia | 57 | 56 | 54 | 53 | 51 | 85 | 84 | 80 | 77 | 74 |
| 2 | alumina/magnesia molar ratio 0.093 | 67 | 65 | 63 | 60 | 58 | 86 | 84 | 82 | 78 | 75 |
| 3 | alumina/magnesia molar ratio 0.250 | 54 | 53 | 52 | 51 | 49 | 85 | 55 | 40 | — | — |

EXAMPLE 5

To magnesia obtained by calcining magnesium hydroxide at 600° C., kaolin, ferric oxide and calcium Table 4

| Calcination temperature (°C) | Calcination time (min.) | COD removal rate (%) Mg | COD removal rate (%) Mg/Al mixture | Chromaticity removal rate (%) at 372 nm Mg | Chromaticity removal rate (%) at 372 nm Mg/Al % | Chromaticity removal rate (%) at 420 nm Mg | Chromaticity removal rate (%) at 420 nm Mg/Al mixture |
|---|---|---|---|---|---|---|---|
| 400 | 30 | 29.4% | 10.1% | 17.7% | 23.1% | 21.2% | 26.7% |
|  | 60 | 16.2 | 11.2 | 31.8 | 25.1 | 34.6 | 28.0 |
|  | 120 | 30.5 | 28.7 | 45.7 | 38.9 | 48.1 | 40.0 |
|  | 180 | 49.8 | 58.3 | 61.5 | 78.2 | 66.4 | 81.0 |
|  | 300 | 66.2 |  | 81.0 |  | 85.0 |  |
| 500 | 30 | 61.0 | 52.9 | 73.7 | 76.7 | 78.3 | 76.0 |
|  | 60 | 64.8 | 60.5 | 81.9 | 80.9 | 85.6 | 84.5 |
|  | 120 | 66.8 | 57.8 | 80.4 | 73.0 | 84.1 | 84.5 |
|  | 180 | 60.1 | 70.8 | 82.7 | 84.8 | 86.9 | 87.7 |
|  | 300 | 49.3 |  | 73.6 |  | 78.0 |  |
| 600 | 30 | 54.7% | 45.3% | 78.8% | 63.2% | 83.0% | 70.7% |
|  | 60 | 51.8 | 65.6 | 70.4 | 83.3 | 74.7 | 87.0 |
|  | 120 | 46.2 | 68.2 | 63.2 | 85.7 | 68.5 | 88.5 |
|  | 180 | 41.8 | 54.7 | 54.9 | 75.7 | 60.5 | 79.3 |
|  | 300 |  |  |  |  |  |  |
| 700 | 30 | 30.8 | 62.1 | 52.3 | 79.1 | 57.0 | 82.3 |
|  | 60 | 31.3 | 58.7 | 44.2 | 70.7 | 49.3 | 76.2 |
|  | 120 | 24.6 | 45.1 | 33.6 | 62.0 | 37.8 | 67.2 |
|  | 180 | 24.6 | 35.6 | 29.5 | 48.7 | 33.3 | 53.5 |
|  | 300 |  |  |  |  |  |  |

EXAMPLE 7

A mixture of 80 parts by weight of magnesium hydroxide and 20 parts by weight of aluminium hydroxide was calcined at 600° C. for 1 hour and the adsorbent thus obtained was used for treating waste cooking liquor of hot chemiground pulp.

The tested adsorbent was regenerated by calcining at 500°–600° C. and the regenerated adsorbent thus obtained was subjected to the adsorption test. In such a manner, the regeneration and the adsorption test were repeated. In this case, the pH value of test water was adjusted to 10, 8, 6 and 4 with caustic soda or hydrochloric acid in order to examine the influence of pH to the adsorption effect.

The results are shown in Table 5.

Table 5

| The number of times of regeneration | COD removal rate (%) pH 10 | COD removal rate (%) pH 8 | COD removal rate (%) pH 6 | COD removal rate (%) pH 4 | Chromaticity removal rate at 372 nm pH 10 | at 372 nm pH 8 | at 372 nm pH 6 | at 372 nm pH 4 | at 420 nm pH 10 | at 420 nm pH 8 | at 420 nm pH 6 | at 420 nm pH 4 |
|---|---|---|---|---|---|---|---|---|---|---|---|---|
| 0 | 64.8 | 63.4 | 63.9 | 63.8 | 90.4 | 90.2 | 91.0 | 92.2 | 96.4 | 96.3 | 96.7 | 97.1 |
| 1 | 51.7 | 53.7 | 57.2 | 54.6 | 88.3 | 89.0 | 90.8 | 91.2 | 95.2 | 95.6 | 96.5 | 96.5 |
| 2 | 59.0 | 59.8 | 57.0 | 60.0 | 88.2 | 88.5 | 90.6 | 91.0 | 95.4 | 95.2 | 96.1 | 96.1 |
| 3 | 56.6 | 60.2 | 62.0 | 60.3 | 87.6 | 89.0 | 90.4 | 90.5 | 95.3 | 95.9 | 96.4 | 96.4 |
| 4 | 55.9 | 57.9 | 58.5 | 55.5 | 85.3 | 87.4 | 89.4 | 89.2 | 94.4 | 95.0 | 96.0 | 95.8 |
| 5 | 58.0 | 58.5 | 57.9 | 57.8 | 82.9 | 86.0 | 88.3 | 88.6 | 93.4 | 94.4 | 95.3 | 95.2 |
| 6 | 51.6 | 54.7 | 61.1 | 56.0 | 82.2 | 85.2 | 87.1 | 88.0 | 92.3 | 93.3 | 94.0 | 94.5 |
| 7 | 62.2 | 58.4 | 60.3 | 50.6 | 82.9 | 86.2 | 88.1 | 88.8 | 93.3 | 94.6 | 95.5 | 95.6 |
| 8 | 51.2 | 50.0 | 53.4 | 60.4 | 78.9 | 82.1 | 83.6 | 84.7 | 91.2 | 92.9 | 93.4 | 93.7 |
| 9 | 56.1 | 55.7 | 45.7 | 41.2 | 81.6 | 84.8 | 87.1 | 86.8 | 93.1 | 94.7 | 95.9 | 94.8 |
| 10 | 60.6 | 58.7 | 54.9 | 60.3 | 77.9 | 82.6 | 84.8 | 80.7 | 90.2 | 92.8 | 93.6 | 90.4 |
| 11 | 64.3 | 55.2 | 59.1 | 55.3 | 77.8 | 81.6 | 82.8 | 80.0 | 90.4 | 92.4 | 92.8 | 90.7 |
| 12 | 56.2 | 60.5 | 58.5 | 41.1 | 71.8 | 76.9 | 77.7 | 70.6 | 86.6 | 90.0 | 90.7 | 82.8 |
| 13 | 50.8 | 34.3 | 55.8 | 12.6 | 66.4 | 69.0 | 73.6 | 51.7 | 83.9 | 87.1 | 87.8 | 58.3 |
| 14 | 44.3 | 46.6 | 47.7 | 28.0 | 67.8 | 71.9 | 71.1 | 48.1 | 81.7 | 84.5 | 82.8 | 51.7 |

What is claimed is:

1. A method of treating waste water which contains organic contaminants comprising contacting the waste water with an adsorbent which comprises a mixture of (1) magnesia obtained by thermal decomposition at 500°–700° C. of a heat-decomposable magnesia-producing compound, and (2) 5–40% by weight based on the total weight of the adsorbent of a metal oxide selected from the group consisting of alumina, ferric oxide, calcium oxide and kaolin, said adsorbent being used in an amount by weight equivalent to 5–20 times the COD value of said waste water, and the pH of said waste water being in the range of 6.5 to 8.5.

2. The method of claim 1 wherein the mixture of magnesia and metal oxide is obtained by calcining at a temperature within a range of 500°–700° C. a mixture of the magnesia-producing compound and a compound selected from the group consisting of aluminum hydroxide, ferric hydroxide, calcium hydroxide and kaolin.

3. The method of claim 1 or claim 2 in which the adsorbent comprises a mixture of magnesia and alumina.

4. The method of claim 1 or claim 2 in which the adsorbent comprises a mixture of magnesia and ferric oxide.

5. The method of claim 1 or claim 2 in which the adsorbent comprises a mixture of magnesia and calcium oxide.

6. The method of claim 1 or claim 2 in which the adsorbent comprises a mixture of magnesia and kaolin.

7. The method of claim 1 or claim 2 in which the magnesia-producing compound is selected from the group consisting of magnesium hydroxide, magnesium carbonate and basic magnesium carbonate.

8. The method of claim 1 or claim 2 further comprising regenerating the spent adsorbent by calcining at a temperature within a range of 500°–700° C.